US009482886B2

(12) United States Patent
Aflatouni et al.

(10) Patent No.: US 9,482,886 B2
(45) Date of Patent: Nov. 1, 2016

(54) INTEGRATED LIGHT SOURCE INDEPENDENT LINEWIDTH REDUCTION (71) Applicant: California Institute of Technology, Pasadena, CA (US)

(72) Inventors: Firooz Aflatouni, Pasadena, CA (US); Behrooz Abiri, Pasadena, CA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 661 days.

(21) Appl. No.: 13/684,061

(22) Filed: Nov. 21, 2012

(65) Prior Publication Data

US 2013/0322807 A1 Dec. 5, 2013

Related U.S. Application Data (60) Provisional application No. 61/562,336, filed on Nov. 21, 2011.

(51) Int. Cl.
| G02F 1/035 | (2006.01) |
| G02F 1/01 | (2006.01) |
| H04B 10/2507 | (2013.01) |
| H04B 10/67 | (2013.01) |

(52) U.S. Cl.
CPC .............. *G02F 1/011* (2013.01); *G02F 1/0121* (2013.01); *H04B 10/2507* (2013.01); *H04B 10/671* (2013.01)

(58) Field of Classification Search
None
See application file for complete search history.

(56) References Cited

U.S. PATENT DOCUMENTS

| 4,847,477 A | 7/1989 | Smith |
| 6,519,375 B1 * | 2/2003 | Rollins et al. ............... 385/2 |

(Continued)

FOREIGN PATENT DOCUMENTS

| JP | 10-090740 A | 4/1998 |
| JP | 2007-235821 A | 9/2007 |

(Continued)

OTHER PUBLICATIONS

Non-Final Office Action for U.S. Appl. No. 13/863,315 mailed Jul. 9, 2014, 6 pages.

(Continued)

*Primary Examiner* — Uyen Chau N Le
*Assistant Examiner* — Chad Smith
(74) *Attorney, Agent, or Firm* — Alston & Bird LLP (57) ABSTRACT

An integrated optical linewidth reduction system detects/estimates the phase noise of an incoming optical signal and subtracts the detected phase noise from the phase noise of the incoming signal. A first coupler/splitter of the linewidth reduction system may split the incoming signal into first and second optical signals travelling through first and second optical paths. A second coupler/splitter may split the second optical signal into third and fourth optical signals travelling through third and fourth optical paths. The third optical path has a longer propagation delay than the fourth optical path. Two different coupling ratios of the third and fourth optical signals are used to generate an electrical signal representative of the phase noise of the incoming signal. A phase detector/estimator estimates the phase noise from the electrical signal. A phase modulator subtracts the detected/estimated phase noise from the phase noise of the incoming signal.

23 Claims, 6 Drawing Sheets

(56) References Cited

U.S. PATENT DOCUMENTS

| | | | |
|---|---|---|---|
| 7,848,370 B2 | 12/2010 | Kewitsch et al. | |
| 2003/0202749 A1* | 10/2003 | Madsen | 385/49 |
| 2007/0206962 A1 | 9/2007 | Lannelli | |
| 2009/0296751 A1 | 12/2009 | Kewitsch et al. | |
| 2014/0140652 A1 | 5/2014 | Aflatouni et al. | |

FOREIGN PATENT DOCUMENTS

| | | |
|---|---|---|
| JP | 2011-049970 A | 3/2011 |
| WO | 2013/078432 A9 | 5/2013 |
| WO | 2013/155533 A1 | 10/2013 |

OTHER PUBLICATIONS

International Preliminary Report on Patentability and Written Opinion for PCT Application No. PCT/US2013/036661 issued Oct. 14, 2014, 10 pages.

International Search Report and Written Opinion in PCT Application No. PCT/US2013/036661 mailed Jul. 26, 2013, 13 pages.

International Search Report and Written Opinion for PCT International Patent Application No. PCT/US2012/066423, mailed on Nov. 21, 2012, in 11 pages.

International Preliminary Report on Patentability for PCT Application No. PCT/US2012/066423 mailed Jun. 5, 2014, 10 pages.

Aflatouni et al., IEEE Trans. Microwave Theory Tech. (2010) vol. 58, No. 11, pp. 3290-3303.

Aflatouni et al., "Wideband Tunable Laser Phase Noise Reduction Using Single Side-Band Modulation in an Electro-Optical Feed-Forward Scheme", Optic Letters (2012) vol. 37, No. 2, pp. 196-198.

Cliche et al., In Bragg Grating Photosens. Poling Conf. (2007) No. BTuE2, pp. 1-3.

Dahmani et al., Optic Letters (1987) vol. 12, No. 11, pp. 876-878.

Seon et al., Midwest Symp. on Circuits and Systems (2000), pp. 1-4.

Stoehr et al., Optic Letters (2006) vol. 31, No. 6, pp. 736-738.

Yariv, Quantum Electronics (1988) 3rd, pp. 577-580.

Zhang et al., ISSCC (2002) 4.2, pp. 1-3.

\* cited by examiner

INTEGRATED LIGHT SOURCE INDEPENDENT LINEWIDTH REDUCTION

CROSS-REFERENCE TO RELATED APPLICATIONS

The present application claims benefit under 35 USC 119(e) of U.S. provisional application No. 61/562,336, filed Nov. 21, 2011, entitled "Integrated Light Source Independent Linewidth Reduction of Lasers Using Feed-Forward Techniques", the content of which is incorporated herein by reference in its entirety.

FIELD OF THE INVENTION

The present invention is related to optical signals, and more particularly to reducing a linewidth of an optical signal.

BACKGROUND OF THE INVENTION

Compact lasers with narrow linewidth are known and used in applications such as molecular and bio-molecular spectroscopy, medical diagnostic systems, high resolution optical ranging, coherent optical communication systems, imaging, optical phased arrays, mm-wave and THz signal generation, electro-optical oscillators, sensing, and the like.

Commercially available Sub-KHz fiber laser linewidths have been achieved at the expense of small wall-plug efficiency, weak tunability, and undesired mode hoping characteristic. Using a conventional feedback technique to cancel phase noise over a large frequency bandwidth often results in feedback loop instability. Accordingly, a need continues to exist for an optical signal linewidth reduction system that overcomes the shortcomings of the conventional linewidth reduction systems.

BRIEF SUMMARY OF THE INVENTION

An integrated optical linewidth reduction system, in accordance with one embodiment of the present invention includes a phase noise detector adapted to detect the phase noise of an incoming optical signal, and a phase modulator adapted to modulate the phase of the incoming optical signal in response to the detected phase noise.

A method of reducing linewidth of an incoming optical signal, in accordance with one embodiment of the present invention, includes detecting a phase noise of the incoming optical signal, and modulating the phase of the incoming optical signal in response to the detected phase noise.

An integrated optical linewidth reduction system, in accordance with one embodiment of the present invention includes, in part, first, second, and third splitters/couplers, a photo detection circuit, and a phase modulator. The first splitter is adapted to split an incoming optical signal into at least first and second optical signals travelling through first and second optical paths. The second splitter is adapted to split the second optical signal into at least third and fourth optical signals travelling through third and fourth optical paths. The third optical path has a longer propagation delay than the fourth optical path.

The third splitter/coupler is adapted to generate a fifth optical signal by coupling a first portion of the third optical signal with a first portion of the fourth optical signal and deliver the fifth optical signal to a fifth optical path. The third splitter/coupler is further adapted to generate a sixth optical signal by coupling a second portion of the third optical signal with a second portion of the fourth optical signal and deliver the sixth optical signal to a sixth optical path.

The photo detection circuit includes, in part, first and second photo detectors. The first photo detector is adapted to generate a first electrical signal in response to the fifth optical signal. The second photo detector is adapted to generate a second electrical signal in response to the sixth optical signal. The photo detection circuit is adapted to supply a third electrical signal in response to the first and second electrical signals. The third electrical signal is representative of the phase noise of the incoming optical signal. The phase modulator is adapted to modulate the phase of the first optical signal in response to a control signal defined by the third electrical signal.

In one embodiment, the integrated optical linewidth reduction system further includes, in part, a phase wrapper adapted to generate the control signal from the third electrical signal. In one embodiment, the phase wrapper further includes, in part, a phase rotator adapted to generate an in-phase signal and a quadrature-phase signal in response to the third electrical signal, and an inverter adapted to perform a modulo operation on the in-phase and quadrature-phase signals.

In one embodiment, the inverter includes, in part, first and second mixers, first and second adders/subtractors, and first and second counters. The first mixer is adapted to generate a first frequency converted signal in response to the in-phase signal and a first oscillating signal. The second mixer is adapted to generate a second frequency converted signal in response to the quadrature signal and a second oscillating signal. The first adder/subtractor is adapted to subtract the second frequency converted signal from the first frequency converted signal. The first counter is adapted to count a number of transitions of the first adder/subtractor. The second counter is adapted to count a number of transitions of the second oscillating signal. The second adder/subtractor is adapted to subtract the second counter's count from the first counter's count to generate a difference representative of the phase noise of the incoming signal.

In one embodiment, the integrated optical linewidth reduction system further includes, in part, a digital-to-analog converter adapted to convert an output signal of the second adder/subtractor to an analog signal, and a driver adapted to generate and apply the control signal to the phase modulator block in response to the analog signal.

In one embodiment, the incoming optical signal is a laser beam. In one embodiment, the first portion of the third optical signal is substantially equal to the first portion of the fourth optical signal. In another embodiment, the first portion of the third optical signal is different from the first portion of the fourth optical signal. In one embodiment, the second portion of the third optical signal is substantially equal to the second portion of the fourth optical signal.

In one embodiment, the integrated optical linewidth reduction system further includes, in part, a true-time delay element disposed in the third optical path to cause the longer propagation delay. In one embodiment, the integrated optical linewidth reduction system further includes, in part, a resonator disposed in the third optical path to cause the longer propagation delay, and a controller adapted to vary a delay associated with the resonator in accordance with a sample of the third electrical signal. In one embodiment, the integrated optical linewidth reduction system further includes, in part, a ring/disk resonator disposed in the third optical path to cause the longer propagation delay. In one embodiment, the integrated optical linewidth reduction system further includes, in part, a waveguide grating disposed in the third optical path to cause the longer propagation delay. In one embodiment, each of the first and second photo detectors is a photo diode.

A method of reducing linewidth of an incoming optical signal, in accordance with one embodiment of the present invention, includes, in part, splitting the incoming optical signal into at least first and second optical signals travelling through first and second optical paths, splitting the second optical signal into at least third and fourth optical signals travelling through third and fourth optical paths, causing the third optical path to have a longer propagation delay than the fourth optical path, generating a fifth optical signal by coupling a first portion of the third optical signal with a first portion of the fourth optical signal, generating a sixth signal optical signal by coupling a second portion of the third optical signal with a second portion of the fourth optical signal, generating a first electrical signal in response to the fifth optical signal, generating a second electrical signal in response to the sixth optical signal, generating a third electrical signal in response to the first and second electrical signals, the third signal being representative of a phase noise of the incoming optical signal, and modulating the phase of the first optical signal in response to a control signal defined by the third electrical signal.

The method, in accordance with one embodiment of the present invention, further includes generating an in-phase signal and a quadrature phase signal in response to the third electrical signal, and performing a modulo operation on the in-phase and quadrature phase signals. The modulo operation, in accordance with one embodiment of the present invention, further includes, converting a frequency of the in-phase signal using a first oscillating signal, converting a frequency of the quadrature-phase signal using a second oscillating signal, subtracting the frequency converted quadrature-phase signal from the frequency converted in-phase signal to generate a first difference signal, counting a number of transitions of the first difference signal, counting a number of transitions of the second oscillating signal, and finding a difference between the number of transitions of the second oscillating signal and the number of transitions of the first difference signal. The difference represents the phase noise of the incoming signal.

The method, in accordance with one embodiment of the present invention, further includes, converting the difference to an analog signal, and modulating the phase of the first optical signal in accordance with the analog signal. In one embodiment, the incoming optical signal is a laser beam. In one embodiment, the first portion of the third optical signal is substantially equal to the first portion of the fourth optical signal. In one embodiment, the first portion of the third optical signal is different from the first portion of the fourth optical signal. In one embodiment, the second portion of the third optical signal is substantially equal to the second portion of the fourth optical signal.

In one embodiment, the method further includes, disposing a true-time delay element in the third optical path to cause the longer propagation delay. In another embodiment, the method further includes disposing a resonator in the third optical path to cause the longer propagation delay, and varying the delay through the resonator in accordance with a sample of the third electrical signal. In yet another embodiment, the method further includes, disposing a ring/disk resonator in the third optical path to cause the longer propagation delay. In another embodiment, the method further includes disposing a waveguide grating in the third optical path to cause the longer propagation delay. In one embodiment, the first electrical signal is generated in response to the first photo-detector, and the second electrical signal is generated in response to the second photo-detector.

DETAILED DESCRIPTION OF THE INVENTION

Figure 1:
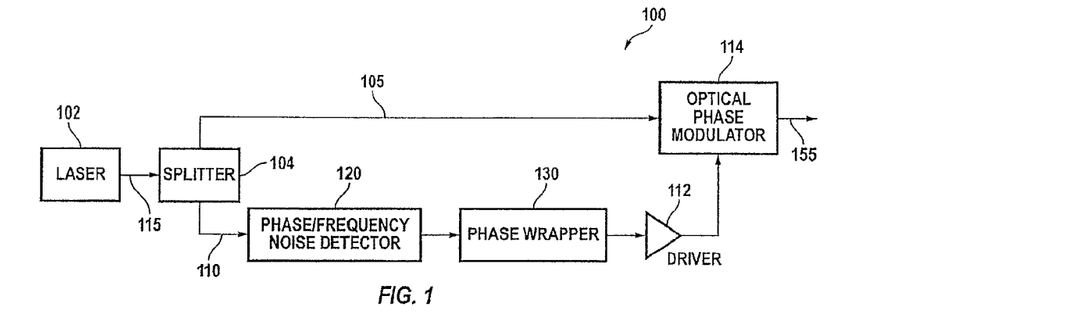
FIG. 1 is a simplified block diagram of an integrated feed-forward linewidth reduction system, in accordance with one exemplary embodiment of the present invention.

FIG. 1 is a simplified block diagram of an integrated feed-forward linewidth reduction system 100, in accordance with one exemplary embodiment of the present invention. Feed-forward linewidth reduction system (alternatively referred to herein as linewidth reduction system) 100 is shown as including, in part, a splitter 104, a phase/frequency noise detector 120, a phase wrapper 130, a driver 112, and an optical phase modulator 114. Linewidth reduction system 100 is adapted to detect the phase noise of the optical signal 115 received from optical signal source 102 and subtract the detected phase noise from the phase of the received optical signal, thereby to deliver an optical signal that has a substantially reduced phase noise and linewidth. In the exemplary embodiment shown in FIG. 1, optical signal source 102 is shown as being a Laser. It is understood, however, that optical source 102 may be any source generating an optical signal having a substantially high degree of coherence.

In one embodiment, the various electrical and optical components/block of linewidth reduction system 100 may be integrated on the same substrate. In another embodiment, the various electrical components/block of linewidth reduction system 100 may be integrated on a first substrate, the various optical components/block of linewidth reduction system 100 may be integrated on a second substrate. In yet other embodiments, linewidth reduction system 100 may be formed on two or more substrates each having disposed thereon one or more electrical and one or more optical components.

In the following, for simplicity, the same reference number may be used to identify both the optical path through which an optical signal travels, as well as to the optical signal which travels through that path. For example, reference numeral 105 may refer to the optical path so identified in FIG. 1, or alternatively to the optical signal that travels through this path. Furthermore, in the following, the terms power divider, power splitter, Y-junction, coupler, or combiner are alternatively used to refer to an optical element adapted to split/divide a signal to generate more signals and/or couple/combine a multitude of optical signals to generate one or more signals. Such a component is also alternatively referred to herein as splitter/coupler.

Splitter/coupler 104 is adapted to split the input optical signal 115 into two optical signals delivered to optical paths 105, 110. Accordingly, the two signals travelling through paths 105, 110 may be defined as $e^{-j(\omega t + \varnothing(t))}$, with $\omega$ and $\varnothing(t)$ respectively representing the frequency and the phase noise of the optical signal 115. In the following, for simplicity, the same reference number may be used to identify the optical path through which an optical signal travels, as well as the optical signal which travels through that path. For example, reference numeral 105 may refer to the optical path so identified in FIG. 1, or alternatively to the optical signal that travels through this path.

Phase/frequency noise detector 120 is adapted to detect the phase or frequency noise of optical signal 110 and convert the detected phase or frequency noise (phase/frequency noise) of optical signal 110 to an electrical current or voltage signal. A number of different systems may be used to detect the phase or frequency noise of an optical signal, such as the Mach-Zehnder Interferometer (MZI) with unequal delay between the interferometer arms, multiple beam interferometers (e.g., Fiber Bragg Gratings), and Fabry-Perot resonators. If the detected signal contains the frequency noise information of the optical signal, it is integrated to provide the phase noise information. Phase wrapper 130 is adapted to wrap the detected phase by performing a modulo $\pi$ operation to generate a phase noise defined by $\phi_m(t) = \text{mod}(\phi(t), 2\pi)$. Driver 112 is adapted to amplify the output signal of phase wrapper 108, which is representative of the phase noise of the optical signal 115, and deliver the amplified signal to optical phase modulator 114. Optical phase modulator 114 is adapted to modulate the phase of signal 105 in accordance with the signal it receives from driver 112. In other words, optical phase modulator 114 is adapted to subtract the detected phase noise from the phase of optical signal 105, and in response deliver an optical signal 155 that has a substantially reduced phase noise and linewidth.

Figure 2:
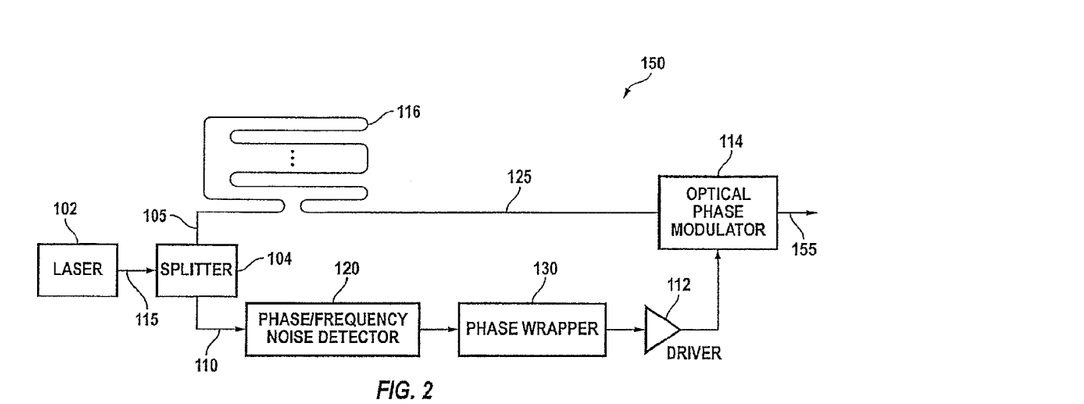
FIG. 2 is a simplified block diagram of an integrated feed-forward linewidth reduction system, in accordance with another exemplary embodiment of the present invention.

FIG. 2 is a simplified block diagram of an integrated feed-forward linewidth reduction system 150, in accordance with another exemplary embodiment of the present invention. Linewidth reduction system 200 is similar to and operates in the same manner as linewidth reduction system 100 except that linewidth reduction system 200 includes an optical delay element 116 in path 105 so as to match the delay between the two optical paths extending from splitter/coupler 152 to optical phase modulator 114.

Figure 3A:
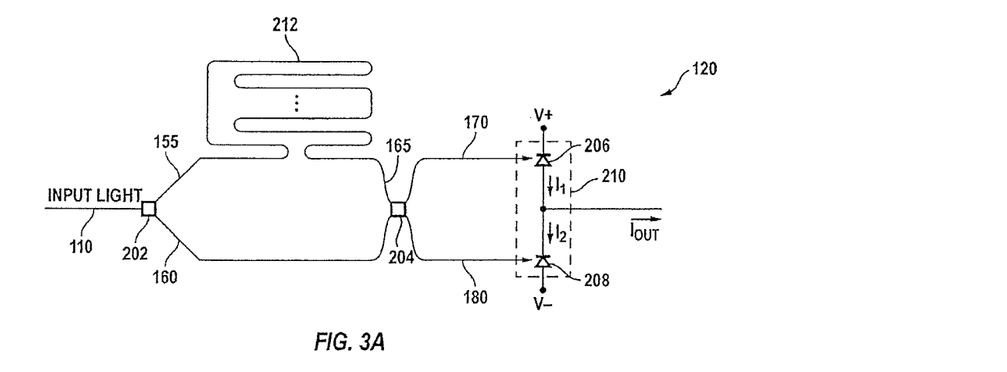
FIGS. 3A-3F are simplified block diagrams of the phase/frequency noise detector shown in FIGS. 1 and 2, in accordance with various exemplary embodiments of the present invention.

FIG. 3A is a simplified block diagram of frequency/phase noise detector 120 of FIGS. 1 and 2, in accordance with one embodiment of the present invention. Optical signal received from path 110 is split into two signals via splitter/coupler 202 and delivered to optical paths 155, 160. Disposed between optical paths 155 and 165 is a true-time delay element 212 adapted to delay the propagation time of the optical signal travelling from splitter/coupler 202 to splitter/coupler 204 via optical paths 155, 165.

Coupler 204 is adapted to couple the two optical signals it receives from paths 160, 165 in accordance with a predefined ratio. For example, in one embodiment, such as the embodiment shown in FIG. 3A, splitter/coupler 204 couples 50% of the optical signal travelling through path 160 with 50% of the optical signal travelling through path 165 and delivers the coupled signal to photo detector 206 via path 170. Coupler 204 couples the remaining 50% of the optical signal travelling through path 160 with the remaining 50% of the optical signal travelling through path 165 and delivers the coupled signal to photo detector 208 via path 180. In another embodiment, splitter/coupler 204 may apply a different ratio to generate the optical signals it delivers to paths 170, 180. Photo-detectors 206, 208 are disposed in a photo-detection circuit 210.

As described above, a first component of the optical signal delivered to each of the photo detectors 206, 208 is received from path 160, and a second component of the optical signal delivered to each of the photo detectors 206, 208 is received from path 165. Since for each photo detector, the two components of the received optical signals have the same frequency, the current generated by each photo detector is substantially independent of the optical signal frequency. The current generated by each photo detector 206, 208 is, however, substantially dependent on the difference between the phases of the two optical signals the phase detector receives. In other words, the current generated by each photo detector 206, 208 is defined, in part, by the difference between the phases of the signals travelling through paths 160, 165. Consequently, the current generated by each photo detector 206, 208 is representative, in part, of the frequency/phase noise of the incoming signal supplied by optical source 102. Furthermore, in accordance with embodiments of the present invention, because phase/frequency noise detector 120 includes a pair of photo detectors, noise-induced imbalances, such as laser intensity noise are coupled to both optical paths 170, 180 and hence received in-phase by both photo detectors 206, 208, while the desired signal received by photo detectors 206, 208 is out-of-phase. As a consequence, photo detection circuit 210's output current signal $I_{out}$, defined by the difference between currents $I_1$, and $I_2$ which flow respectively through photo detectors 206, 208, has a substantially enhanced immunity to noise. Referring to FIGS. 2 and 3A, current signal $I_{out}$ generated by photo detection circuit 210 is delivered to phase wrapper 130. A transimpedance amplifier (not shown) may be used to convert current $I_{out}$ to a voltage and deliver this voltage to phase wrapper 130.

Figure 3B:
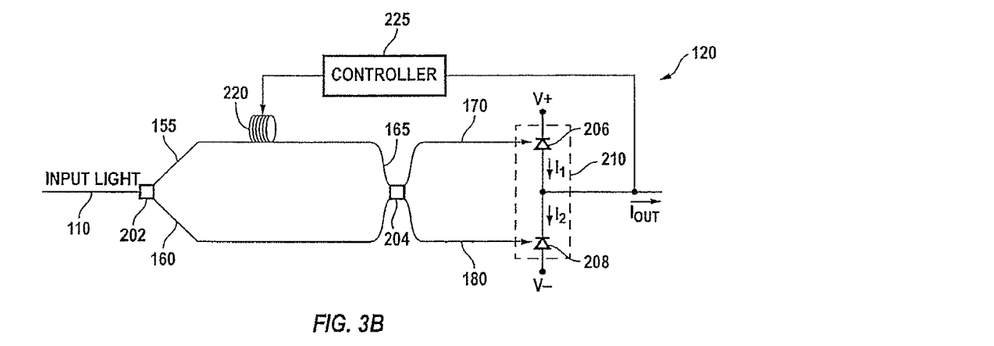

FIG. 3B is a simplified block diagram of another exemplary embodiment of frequency/phase noise detector 120 shown in FIGS. 1 and 2. The frequency/phase noise detector shown in FIG. 3B is similar to the one shown in FIG. 3A except that the frequency/phase noise detector of FIG. 3B includes a resonator 220 disposed between delay paths 155, 165 and a controller 225 adapted to vary the delay through resonator 220 in accordance with a sample of current signal $I_{out}$ generated by phase detection circuit 210.

Figure 3C:
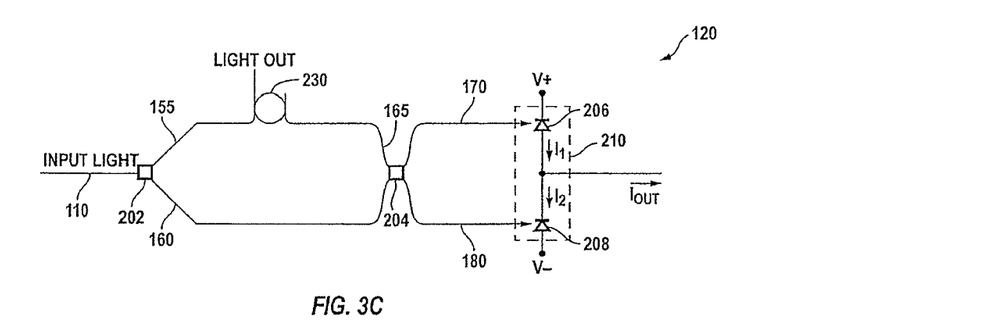

FIG. 3C is a simplified block diagram of another exemplary embodiment of frequency/phase noise detector 120 shown in FIGS. 1 and 2. The frequency/phase noise detector shown in FIG. 3C is similar to the one shown in FIG. 3A except that the frequency/phase noise detector of FIG. 3C includes a ring/disk resonator 230 disposed between delay paths 155, 165 to generate a delay. The optical signal in path 155 is received by the add port of ring/disk resonator 230. The drop port of ring/disk resonator 230 delivers the optical signal to path 165.

Figure 3D:
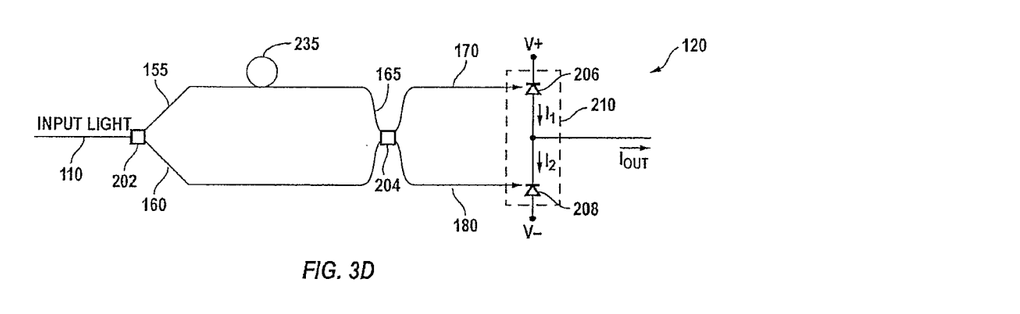

FIG. 3D is a simplified block diagram of another exemplary embodiment of frequency/phase noise detector 120 shown in FIGS. 1 and 2. The frequency/phase noise detector shown in FIG. 3D is similar to the one shown in FIG. 3A except that the frequency/phase noise detector of FIG. 3C includes a ring/disk resonator 235 disposed between delay paths 155, 165 to generate a delay. The through ports of ring/disk resonator 235 are used to receive the optical signal from path 155 and deliver the optical signal to path 165.

Figure 3E:
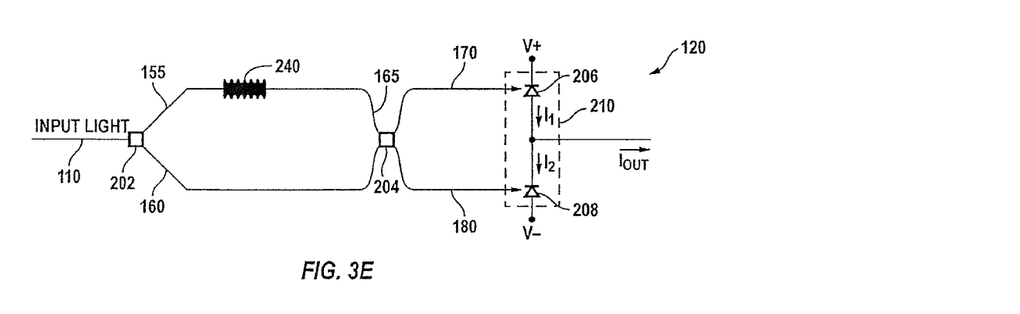

FIG. 3E is a simplified block diagram of another exemplary embodiment of frequency/phase noise detector 120 shown in FIGS. 2A, 2B. The frequency/phase noise detector shown in FIG. 3D is similar to the one shown in FIG. 3A except that the frequency/phase noise detector of FIG. 3C includes a waveguide grating 240 disposed between delay paths 155, 165 to generate a delay.

Frequency/phase noise detector 120 of FIG. 3A has a wideband frequency response due to its use of a true-time delay 212. The frequency/phase noise detectors shown in FIGS. 3B-3E have relatively narrower bandwidths. The bandwidths of the frequency/phase noise detectors shown in FIGS. 3B-3E may be increased by using multiple cascaded (or coupled) resonators (Vernier effect realization) or tapered designs.

Figure 3F:
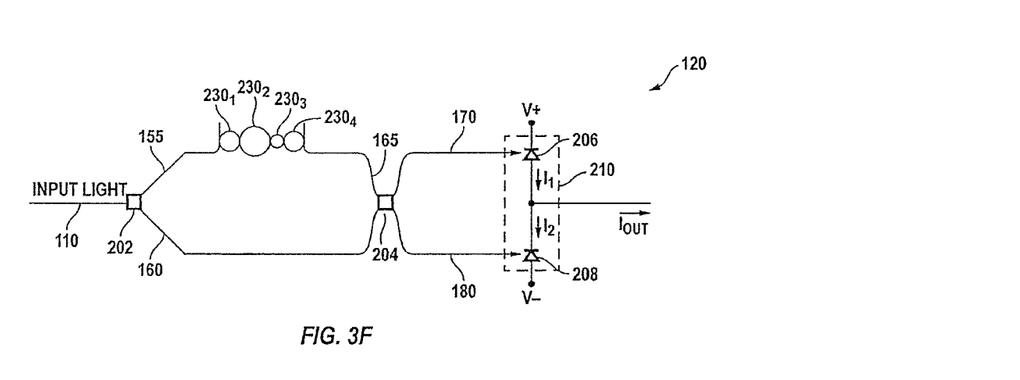

FIG. 3F is a simplified block diagram of another exemplary embodiment of frequency/phase noise detector 120 which includes a multitude of resonators coupled together to enhance the bandwidth of the resonator. Four such resonators $230_1$, $230_2$, $230_3$, and $230_4$ are shown as being used in frequency/phase noise detector 120 of Figure. Although it is understood that any number of such resonators may be coupled to one another to increase the bandwidth. It is also understood that resonators $230_1$, $230_2$, $230_3$, and $230_4$ may have similar to different sizes.

Figure 4:
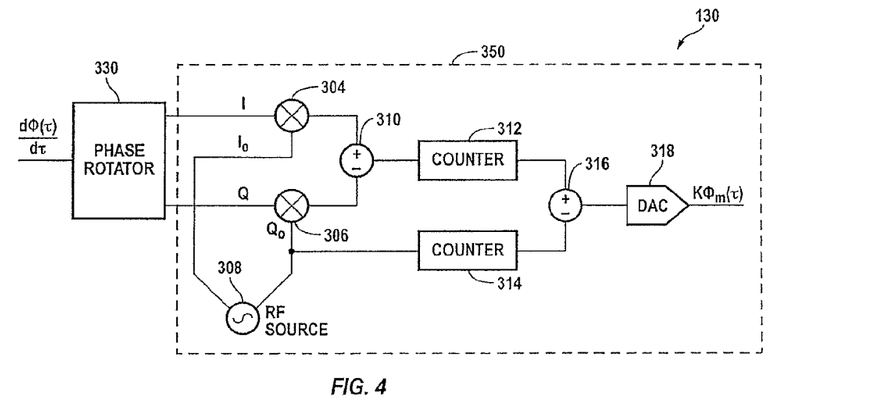
FIG. 4 is a block diagram of the phase wrapper shown in FIGS. 1 and 2, in accordance with one exemplary embodiment of the present invention.

FIG. 4 is a block diagram of phase wrapper 130 shown in FIGS. 1 and 2, in accordance with one embodiment of the present invention. Phase wrapper 130 is shown as including a phase rotator 330, as well as a phase estimator 350 adapted to perform sine inversion. Phase estimator 350 (also referred to herein as Sine inverter) is shown as including first and second mixers 304, 306, an oscillator 308, adders/subtractors 310, 316, counters 312, 314, and an optional digital-to-analog converter 318.

Assume that the phase noise of the optical signal being detected is characterized by a Brownian motion. Accordingly, the variance of the optical phase noise increases linearly with time. In one embodiment, the input-output voltage across phase rotator 330 may be defined as:

$$V_{out}=A \sin(k\int V_{in}(t)) \quad (1)$$

where A and k are constants. Phase rotator 330 may be formed using any number of known phase rotators to achieve phase rotation.

Sine inverter 350 is adapted to discriminate the phase-wrapped phase noise of the optical signal it receives from phase rotator 330. The discriminated phase noise is subsequently subtracted from the phase of incoming optical signal 105 by phase modulator 114, as shown in FIGS. 1, 2.

As is seen from FIG. 4, mixers 304 and 308 of sine inverter 350 are adapted to down convert the frequency of the in-phase and quadrature-phase signal received from phase rotator 330 using RF source 308. Adder/subtractor 310 is adapted to subtract the output signal of mixer 306 from the output of mixer 304 to generate a signal whose number of transitions or zero crossings are counted by counter 312. Likewise, the number of zero-crossings of RF source 308 is counted by counter 314. Adder/subtractor subtracts the output of counter 314 from the output of counter 312 to generate a digital signal representative of the phase noise Ø(t) of the incoming signal 115 (see FIG. 1). DAC 318 is adapted to convert the digital output signal of counter 316 to an analog signal.

Assume that the input of the phase rotator is represented by $$V_{in} x \frac{d\phi(t)}{dt},$$

with $V_{in}$ representing a constant and Ø(t) representing the phase noise of the incoming (input) signal, as described above. Accordingly, the output of adder/subtractor 310 may be represented as:

$$V_{out}(t)=A \sin(w_e t - K\phi_m(t))$$

where K represents a constant, $\phi_m(t)=\text{mod}(\phi(t), 2\pi)$ represents the phase noise of input signal 115, and $w_e$ represents the angular frequency of oscillator 308. Accordingly, counters 312 generates a count defined by $(w_e t - K\phi_m(t))$, and counters 314 generates a count defined by $(w_e t)$. Consequently, the output of adder/subtractor 316 is a digital signal defined by $K\phi_m(t)$, which is representative of the phase noise of signal 115. It is understood that any one of a number of known phase estimators that can estimate the phase Ø from Sin(Ø) or Cos (Ø) may be used.

Referring to FIGS. 1, 2 and 4 concurrently, the output of DAC 38 is further amplified by driver 112 and applied to optical phase modulator 114. In response, optical phase modulator 114 subtracts the discriminated phase noise from the phase of the optical signal 105. The optical signal 155 supplied by optical phase modulator thus has a substantially reduced phase noise and linewidth.

Figure 5A:
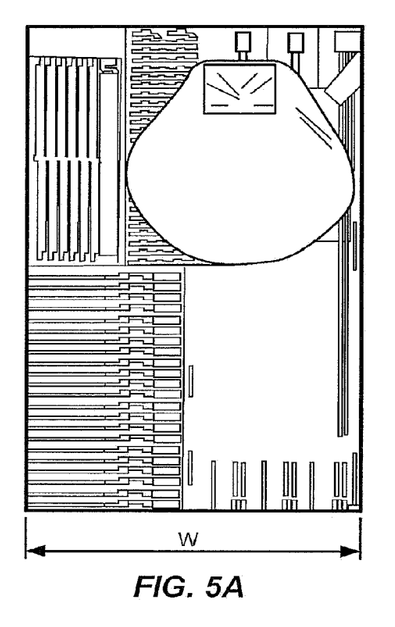
FIGS. 5A and 5B are top views of respectively a manufactured photonic chip and a manufactured electronic chip that together form an optical linewidth reduction system, in accordance with one embodiment of the present invention.
Figure 5B:
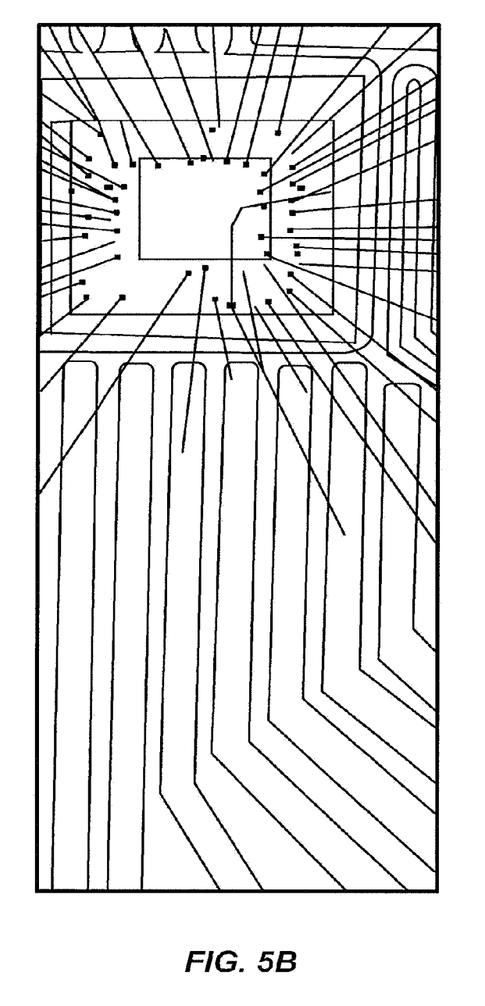
Figure 5C:
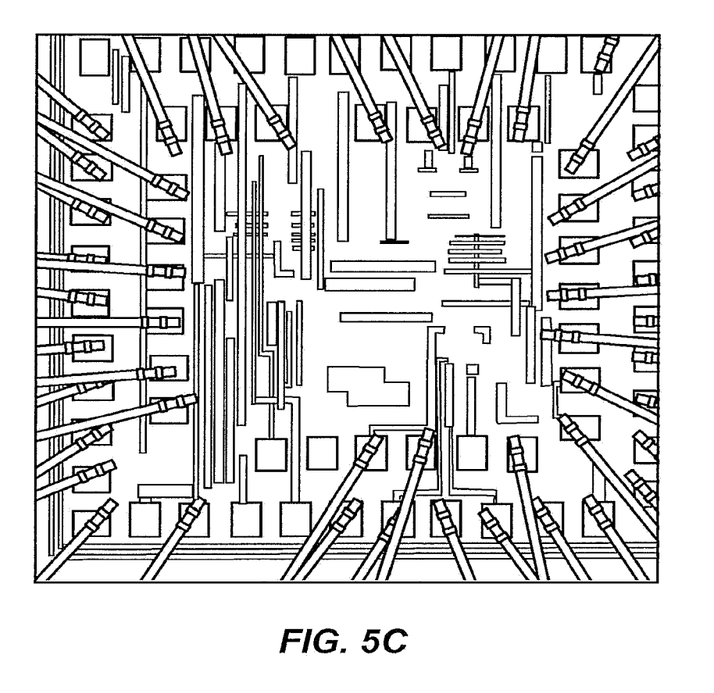
FIG. 5C is an expanded top view of the electronic chip shown in FIG. 5B.
Figure 5D:
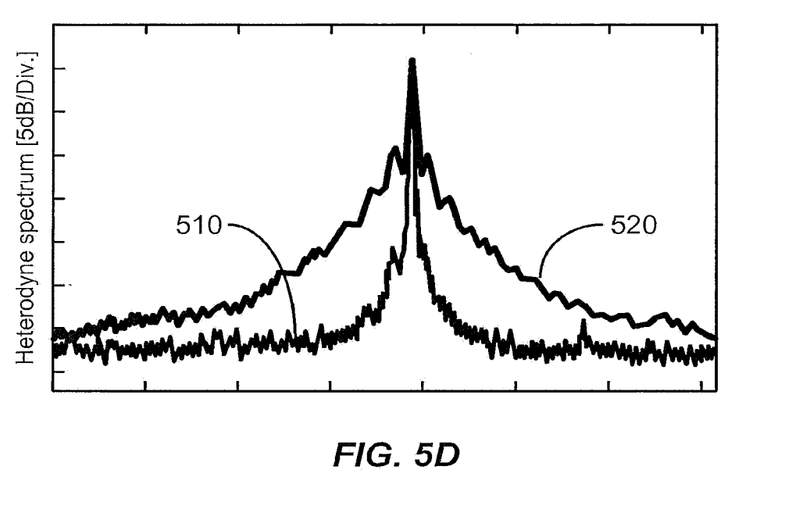
FIG. 5D shows the measured linewidth of a laser beam generated by the linewidth reduction system of FIGS. 5A, 5B.

FIGS. 5A and 5B are top views of respectively a manufactured photonic chip and a manufactured electronic chip that together form an optical linewidth reduction system. The electronic chip of FIG. 5B is manufactured using a 65 nm CMOS process. The photonic chip of FIG. 5A is manufactured using an IMEC silicon-on-insulator process. The width W of both chips is 2 mm. FIG. 5C is an expanded top view of electronic chip shown in FIG. 5B. Plot 510 of FIG. 5D shows the measured linewidth of a laser beam generated by the linewidth reduction system of FIGS. 5A, 5B. Plot 520 of FIG. 5D shows the measured original linewidth of the input laser. As is readily seen, the linewidth of plot 510 is narrower than the linewidth of plot 520 by a factor of 20. It is understood, that the photonic chip and the electronic may be integrated on the same substrate.

The above embodiments of the present invention are illustrative and not limitative. Embodiments of the present invention are not limited by the type of beam splitting, beam coupling, optical delay generation, frequency/phase detection, phase modulation, photo detection, control circuitry, or the like. Embodiments of the present invention are not limited by the wavelength of the incoming optical signal, nor are they limited by the type or the number of substrates, semiconductor or otherwise, in which the linewidth reduction system may be formed. Other additions, subtractions or modifications are obvious in view of the present disclosure and are intended to fall within the scope of the appended claims.

What is claimed is:

1. An integrated optical linewidth reduction system comprising:
    a first splitter/coupler adapted to split an incoming optical signal into at least first and second optical signals travelling through first and second optical paths;
    a second splitter/coupler adapted to split the second optical signal into at least third and fourth optical signals travelling through third and fourth optical paths, said third optical path having a longer propagation delay than said fourth optical path;

a third splitter/coupler adapted to generate a fifth optical signal by coupling a first portion of the third optical signal with a first portion of the fourth optical signal and deliver the fifth optical signal to a fifth optical path, the third said splitter/coupler being further adapted to generate a sixth optical signal by coupling a second portion of the third optical signal with a second portion of the fourth optical signal and deliver the sixth optical signal to a sixth optical path;

a photo detection circuit comprising first and second photo detectors, said first photo detector being adapted to generate a first electrical signal in response to the fifth optical signal, said second photo detector being adapted to generate a second electrical signal in response to the sixth optical signal, said photo detection circuit supplying a third electrical signal in response to the first and second electrical signals; said third electrical signal being representative of a phase noise of the incoming optical signal;

a phase modulator adapted to modulate the phase of the first optical signal in response to a control signal defined by the third electrical signal;

a phase wrapper adapted to generate the control signal from the third electrical signal, said phase wrapper comprising:

a phase rotator adapted to generate an in-phase signal and a quadrature-phase signal in response to the third electrical signal; and an inverter adapted to perform a modulo operation on the in-phase and quadrature-phase signals.

2. The integrated optical linewidth reduction system of claim 1 wherein said inverter comprises:

a first mixer adapted to generate a first frequency converted signal in response to the in-phase signal and a first oscillating signal;

a second mixer adapted to generate a second frequency converted signal in response to the quadrature signal and a second oscillating signal;

a first adder/subtractor adapted to subtract the second frequency converted signal from the first frequency converted signal;

a first counter adapted to count a number of transitions of the first adder/subtractor;

a second counter adapted to count a number of transitions of the second oscillating signal; and a second adder/subtractor adapted to subtract the second counter's count from the first counter's count to generate a difference representative of the phase noise of the incoming signal.

3. The integrated optical linewidth reduction system of claim 2 further comprising:

a digital-to-analog converter adapted to convert an output signal of the second adder/subtractor to an analog signal; and a driver adapted to generate and apply the control signal to the phase modulator block in response to the analog signal.

4. The integrated optical linewidth reduction system of claim 1 wherein said incoming optical signal is a laser beam.

5. The integrated optical linewidth reduction system of claim 1 wherein said first portion of the third optical signal is substantially equal to the first portion of the fourth optical signal.

6. The integrated optical linewidth reduction system of claim 5 wherein said second portion of the third optical signal is substantially equal to the second portion of the fourth optical signal.

7. The integrated optical linewidth reduction system of claim 1 wherein said first portion of the third optical signal is different from the first portion of the fourth optical signal.

8. The integrated optical linewidth reduction system of claim 1 further comprising:

a true-time delay element disposed in the third optical path to cause the longer propagation delay.

9. The integrated optical linewidth reduction system of claim 1 further comprising:

a resonator disposed in the third optical path to cause the longer propagation delay; and a controller adapted to vary a delay associated with the resonator in accordance with a sample of the third electrical signal.

10. The integrated optical linewidth reduction system of claim 1 further comprising:

a ring/disk resonator disposed in the third optical path to cause the longer propagation delay.

11. The integrated optical linewidth reduction system of claim 1 further comprising:

a waveguide grating disposed in the third optical path to cause the longer propagation delay.

12. The integrated optical linewidth reduction system of claim 1 wherein each of said first and second photo detectors is a photo diode.

13. A method of reducing linewidth of an incoming optical signal, the method comprising:

splitting the incoming optical signal into at least first and second optical signals travelling through first and second optical paths;

splitting the second optical signal into at least third and fourth optical signals travelling through third and fourth optical paths;

causing said third optical path to have a longer propagation delay than said fourth optical path;

generating a fifth optical signal by coupling a first portion of the third optical signal with a first portion of the fourth optical signal;

generating a sixth signal optical signal by coupling a second portion of the third optical signal with a second portion of the fourth optical signal;

generating a first electrical signal in response to the fifth optical signal;

generating a second electrical signal in response to the sixth optical signal;

generating a third electrical signal in response to the first and second electrical signals, said third signal being representative of a phase noise of the incoming optical signal;

modulating the phase of the first optical signal in response to a control signal defined by the third electrical signal;

generating an in-phase signal and a quadrature phase signal in response to the third electrical signal; and performing a modulo operation on the in-phase and quadrature phase signals, wherein said modulo operation comprises:

converting a frequency of the in-phase signal using a first oscillating signal;

converting a frequency of the quadrature-phase signal using a second oscillating signal:

subtracting the frequency converted quadrature-phase signal from the frequency converted in-phase signal to generate a first difference signal;

counting a number of transitions of the first difference signal;

counting a number of transitions of the second oscillating signal; and finding a difference between the number of transitions of the second oscillating signal and the number of transitions of the first difference signal, said difference being representative of the phase noise of the incoming signal.

14. The method of claim 13 further comprising:

converting said difference to an analog signal; and modulating the phase of the first optical signal in accordance with the analog signal.

15. The method of claim 13 wherein said incoming optical signal is a laser beam.

16. The method of claim 13 wherein said first portion of the third optical signal is substantially equal to the first portion of the fourth optical signal.

17. The method of claim 13 wherein said first portion of the third optical signal is different from the first portion of the fourth optical signal.

18. The method of claim 13 wherein said second portion of the third optical signal is substantially equal to the second portion of the fourth optical signal.

19. The method of claim 13 further comprising:

disposing a true-time delay element in the third optical path to cause the longer propagation delay.

20. The method of claim 13 further comprising:

disposing a resonator in the third optical path to cause the longer propagation delay; and varying a delay associated with the resonator in accordance with a sample of the third electrical signal.

21. The method of claim 13 further comprising:

disposing a ring/disk resonator in the third optical path to cause the longer propagation delay.

22. The method of claim 13 further comprising:

disposing a waveguide grating in the third optical path to cause the longer propagation delay.

23. The method of claim 13 further comprising:

generating the first electrical signal in response to a first photo-detector; and generating the second electrical signal in response to a second photo-detector.

* * * * *